July 23, 1940.                J. A. H. BARKEIJ                2,209,013
VALVE GEAR FOR MULTICYLINDER RADIAL ENGINES, TOGETHER
WITH A REDUCTION AND CLUTCH DRIVE GEAR
Original Filed Dec. 9, 1935
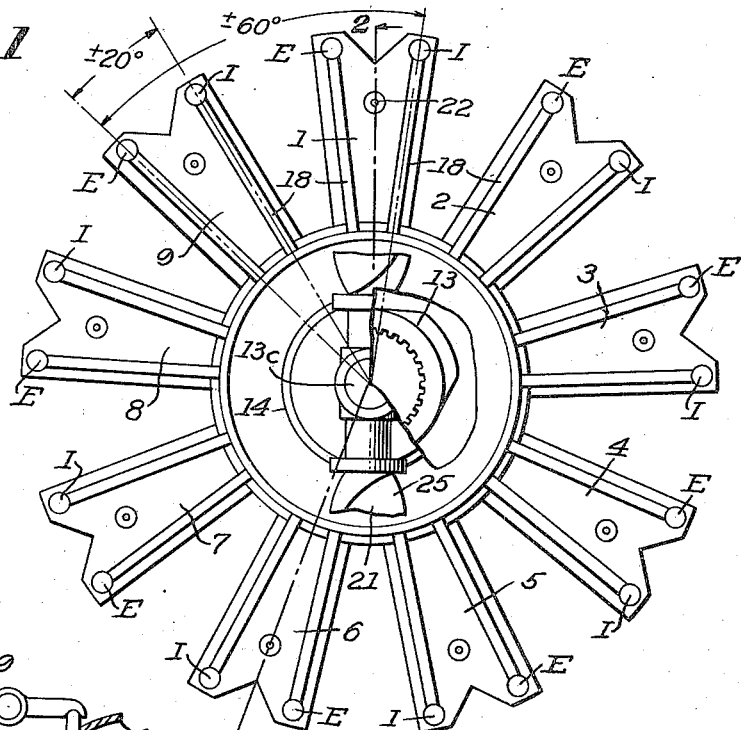
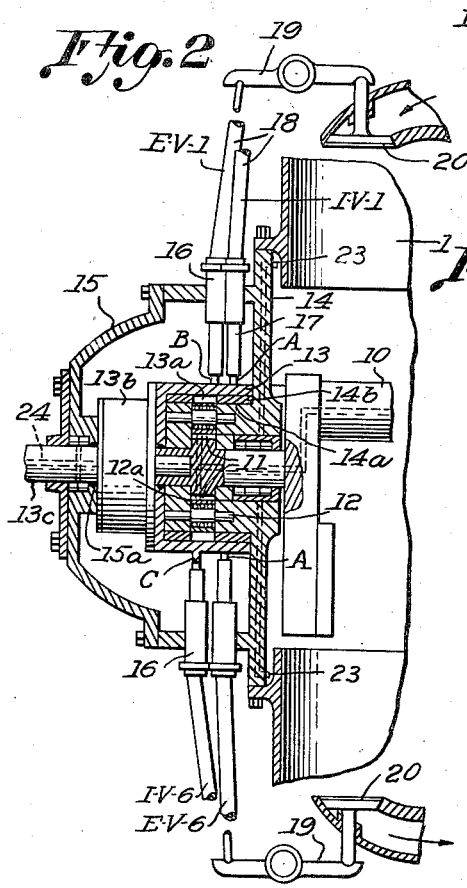
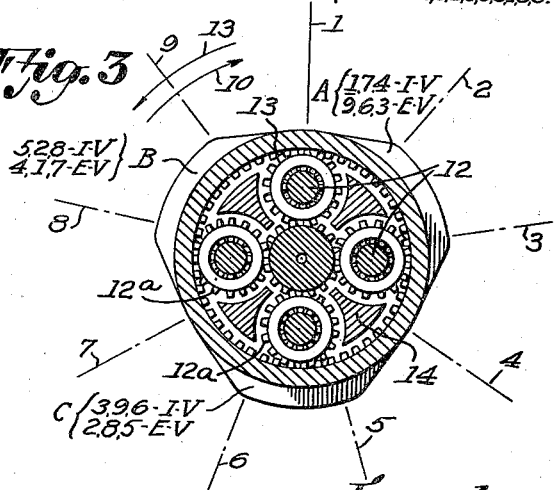
START-INLET-SEQUENCE-1,3,5,7,9,2,4,6,8.
START-EXHAUST-SEQUENCE-7,9,2,4,6,8,1,3,5.
Inventor:
J.A.H. Barkeij Patented July 23, 1940

2,209,013

UNITED STATES PATENT OFFICE 2,209,013

VALVE GEAR FOR MULTICYLINDER RADIAL ENGINES, TOGETHER WITH A REDUCTION AND CLUTCH DRIVE GEAR

Jean A. H. Barkeij, Altadena, Calif.

Application December 9, 1935, Serial No. 53,450
Renewed April 3, 1939

4 Claims. (Cl. 123—55)

My invention relates more in particular to the radial type of engine, having cylinders arranged in star form, and I provide therein a camshaft with a plurality of cams which lifts the inlet valve of one cylinder and subsequently the exhaust valve of another cylinder. It is, however, understood, that the reduction gear and clutch-drive is independent of the radial type.

My invention further relates to a reduction gear for a propeller drive consisting of a single sun-gear on the crankshaft, a number of stationary planetary gears, and a ring gear around and meshed with said planetary gears. This invention is independent of the radial formation of the cylinders.

My invention further relates to a lubricating system by which the oil is led from the crankshaft to said reduction gear and at the same time towards the propeller shaft.

My invention further relates to a reduction gear for a propeller drive, in which the propeller shaft has a bearing in the crankshaft and reduction gears between said propeller shaft and crankshaft.

My invention further relates to a resilient clutch drive between said propeller shaft and said crankshaft. This is also independent of the radial-form, though associated with the camshaft and propeller drive.

It is further the object of my invention to merge the camshaft-drive with the gear reduction drive for the propeller and to combine said drive with said reduction drive, to deaden the noise of said gear drive and also of said propeller. The motor crankshaft and propeller rotate in opposite direction.

Other objects will appear in the following description.

Referring to the accompanying drawing, Fig. 1 shows diagrammatically the arrangement of the nine cylinders with intervals of 40° around a crankshaft. Each cylinder has an overhead-valve-lifting arrangement for each exhaust- and each inlet-valve, as is well known in the art. In the present arrangement the exhaust and inlet valves alternate with each other as shown in the drawing, in Fig. 1.

Fig. 2 shows Fig. 1 on the section line 2—2 thereof, going approximately through the axes of cylinders 1 and 6, and shows in vertical cross section the left part of the motor and crankcase, the camshaft drive, the reduction gear and the clutch drive for the propeller.

Fig. 3 shows the camshaft 13 of Fig. 2 on the section line 3—3 thereof, showing three cams A, B, and C arranged substantially at 120°.

Referring to the figures in particular, in Fig. 1 the cylinders are indicated respectively in clockwise direction by the numbers 1 to 9, and each inlet-valve (the valve, valve-rocker, pushrod, pushrod-cover, etc.) is indicated by the capital letter I and each exhaust valve (with similar parts) is indicated by the letter E. The pushrod tubes or covers are indicated by 18, the cam follower proper by 17, and the cam-follower-guide by 16.

In Fig. 2, the crankshaft is designated by number 10, having at the left end thereof a sun gear 11, geared to a plurality (3 or 4) of gear wheels 12a having in the inside thereof a needle bearing or ball- or roller-bearing, which bearing rests on a stationary shaft 12. The present construction is cheaper to make and easier to assemble, because the shafts are inserted from the left into the anti-friction bearings and into the crankcase-body 14.

Said gear wheels 12a are geared to the internal gear wheel 13a, which forms a unit with the camshaft 13 having on the outside thereof three cams A, B and C. This camshaft rests upon a bearing 14b on each side of said internal gear wheel 13a, and said bronze (or other metal) bearing rests upon a shelf 14a of the crankcase 14.

The camshaft 13 has only three cams arranged radially at 120° and in planes perpendicular to the axis thereof, in three parallel planes. Each cam lifts the three inlet valves of three cylinders arranged at 120°, and the three exhaust valves of three cylinders arranged at 120°, said two sets of three cylinders being adjacent to each other.

This camshaft is shown in sideview in Fig. 3. Each cam has about the length of 120° of the circumference of the cam, and may be shaped in any form which will allow a high speed of the motor, and does not require excessive spring pressure to keep the valves 20 in touch with the valve rockers 19 at any time. I use by preference a cam-follower as now used in this type of engine, having a roller, which rotates on a stationary shaft in the cam follower, 17.

Although in the present construction the gear-reduction drive is merged with the camshaft drive, it is understood that the specific camshaft rotating at half engine speed and having only three cams may be applied separately on engines, apart from the gear reduction shown, the propeller being fastened immediately to the crankshaft.

The cam A operates for instance the inlet valves of cylinders 1, 7, 4 and the exhaust valves of cylinders 9, 6, 3. The cam B operates the inlet valves of cylinders 5, 2, 8 and the exhaust valves of cylinders 4, 1, 7. The cam C operates the inlet valves of cylinders 3, 9, 6 and the exhaust valves of cylinders 2, 8, 5. It is understood, of course, that this arrangement may be shifted around, but one cam will always lift three inlet valves of three cylinders arranged at 120°, and three exhaust valves of three other cylinders, also arranged at 120°.

It is understood that the radial angle of the pushrods 18 may be varied so that the proper length of the exhaust period of one cylinder is properly related to the inlet period of the other cylinder, which may be approximately of the same length. The angle of the valves to the cylinder axis can be varied also considerably so that enough leeway is left all around to apply conveniently the present construction. The operation of the valve gear will be explained next. In Figs. 3, 2 and in Fig. 1, the camshaft 13 is drawn in such a position that the cam A begins to lift the inlet valve of cylinder 1, and the cam B begins to lift the exhaust valve of cylinder 7, and the inlet valve of cylinder 6 is lifted. In the drawing and description we assume, as said before, that the exhaust and inlet period are each about 240° crankshaft revolution, and the compression and expansion period together also 240°. The axes of the pushrods of the various cylinders in Fig. 1 are shown about radially, intersecting each other in the axis of the crankshaft. It is, however understood that their angle may be greatly varied so that their axes are tangential to a circle, described around the axis of the crankshaft. The angle between the axes of the pushrod of inlet valve of cylinder 1, and of the corresponding pushrod of exhaust valve of cylinder 9 is shown as approximately 60°.

The sequence of the starts of the inlet periods is 1, 3, 5, 7, 9, 2, 4, 6, 8 and the corresponding sequence of the starts of the exhaust periods of the cylinders is 7, 9, 2, 4, 6, 8, 1, 3, 5. Constructing the axes of said pushrods of said inlet valves of said first sequence of cylinders at an angle of about 60° to the axes of the pushrods of the exhaust valves of cylinders 9, 2, 4, 6, 8, 1, 3, 5, it is possible to lift all the valves in the proper order with only three cams on a camshaft rotating at half engine speed.

This same principle may be applied on various other types, if it is possible to arrange the corresponding pushrods of the inlet valves and exhaust valves at such an angle that the cam lifting an inlet valve, lifts another exhaust-valve-pushrod at the proper time in the proper sequence of a radial engine having its cylinders arranged radially at certain angles. It is considered superfluous to show a similar construction for other types, but all types are considered to fall under the scope of the following claims.

It is understood that the engine may be air-cooled and in Fig. 1, these cooling ribs are not shown in order to show the present arrangement more clearly. The spark plugs are indicated by number 22 and are usually located below the valves, one on each side of the cylinder barrel practically opposite each other.

The camshaft, camshaft bearing, gear wheels are oiled under pressure from the oil lead 23 shown in Fig. 2 by a dotted line through the left wall of the crankcase 14. However, it is understood that the entire gear may be lubricated from a central oil conduit 24 in the crankshaft 10, leading oil to the sungear 11 and from there to the gear wheels 12a and to the camshaft 13, provided on its bearing surface with oil grooves in any effective manner. This conduit 24 may further lead oil to the bearing in the nose piece 15 and to the mechanism to change the pitch of the propeller blades, indicated by 25 in Fig. 1. These two oil leads 23 and 24 communicate with each other through the space in which said gear wheels 12 rotate between the sun gear, and camshaft, said space having a branch from the oil lead 24 and a branch from the oil lead 23 in the wall of the crankcase.

Various modifications of all these latter features are included within the scope of the following claims.

I claim:

1. In a nine cylinder radial engine, having its cylinders arranged substantially at 40° interval, an exhaust valve and an inlet valve for each cylinder, pushrods for said valves and camfollowers for said pushrods, a camshaft having three cams located in three parallel planes, each of said cams lifting in proper sequence for a fourstroke cycle operation an exhaust valve of one cylinder and an inlet valve of another cylinder in spaced relationship.

2. In a nine cylinder radial engine, having its cylinders arranged at 40°, a camshaft rotating at half engine speed, said camshaft having three cams arranged at 120° and arranged in three parallel planes, each cam lifting the inlet valves of three cylinders arranged at 120° and the exhaust valves of three cylinders arranged also at 120°, each of said cams lifting an inlet valve and an exhaust valve of different cylinders in spaced relationship, the three latter cylinders arranged at an angle of 40° to said former three cylinders and being adjacent to each other in pairs.

3. In a nine cylinder, having its cylinders arranged at 40°, a camshaft rotating at half engine speed, said camshaft having three cams arranged at 120° and arranged in three parallel planes, each cam lifting the inlet valves of three cylinders arranged at 120° and the exhaust valves arranged also at 120°, said cylinders being numbered 1 to 9 in clockwise direction, one of said cams lifting the inlet valves of cylinders 1, 7, 4 and the exhaust valves of cylinders 9, 6, 3, the second cam thereof lifting the inlet valves of cylinders 5, 2, 8 and the exhaust valves of cylinders 4, 1, 7, the third cam lifting the inlet valves of cylinders 3, 9, 6 and the exhaust valves of cylinders 2, 8, 5.

4. The combination of claim 3 in which said camshaft rotates in a direction opposite to that of the engine.

J. A. H. BARKEIJ.